United States Patent [19]

Harvey

[11] 3,985,224

[45] Oct. 12, 1976

[54] CONVEYOR BELT

[75] Inventor: George Arthur Harvey, Blakedown, England

[73] Assignee: U.M.E.C.-Boydell (Belting) Limited, Heath Town, Wolverhampton, England

[22] Filed: Mar. 17, 1975

[21] Appl. No.: 559,001

[52] U.S. Cl. .............................. 198/851; 74/250 C; 198/848; 198/841
[51] Int. Cl.[2] ......................................... B65G 17/06
[58] Field of Search ................... 198/183, 189, 195; 74/249, 250 R, 250 C, 254

[56] References Cited
UNITED STATES PATENTS

| 1,507,832 | 9/1924 | Henry | 198/189 X |
| 1,638,267 | 8/1927 | Morehead et al. | 198/189 |
| 2,165,434 | 7/1939 | Wilson | 198/189 |
| 2,697,509 | 12/1954 | Cushman | 198/183 |
| 2,866,538 | 12/1958 | Goldberg | 198/189 |
| 2,911,091 | 11/1959 | Imse | 198/189 |
| 3,082,861 | 3/1963 | Kornylak | 198/195 |
| 3,441,123 | 4/1969 | Griffith | 198/195 |
| 3,643,792 | 2/1972 | Resener | 198/189 |
| 3,669,247 | 6/1972 | Pulver | 198/189 |
| 3,870,141 | 3/1975 | Lapeyre et al. | 198/189 X |

FOREIGN PATENTS OR APPLICATIONS

| 930,440 | 6/1955 | Germany | 198/195 |
| 192,327 | 11/1956 | Germany | 198/195 |
| 1,168,030 | 10/1969 | United Kingdom | 198/189 |
| 911,254 | 11/1962 | United Kingdom | 198/189 |
| 663,106 | 12/1951 | United Kingdom | 198/195 |

*Primary Examiner*—John J. Love
*Assistant Examiner*—Richard K. Thomson
*Attorney, Agent, or Firm*—Kemon, Palmer & Estabrook

[57] ABSTRACT

A conveyor belt comprises a series of cross rods coupled together at their ends in parallel relationship at fixed distances apart, and plate links which extend between the cross rods and are hingedly connected to the cross rods solely by virtue of nestling engagement of parts of the peripheries of the cross rods in channel-shaped recesses at opposite sides of the links, the mouths of the recesses at the opposite sides of each link being directed away from one another lengthwise of the belt.

9 Claims, 3 Drawing Figures

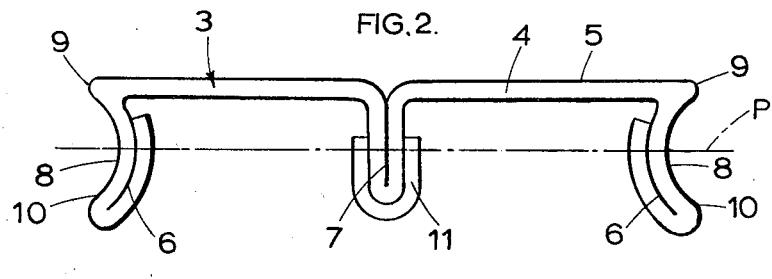
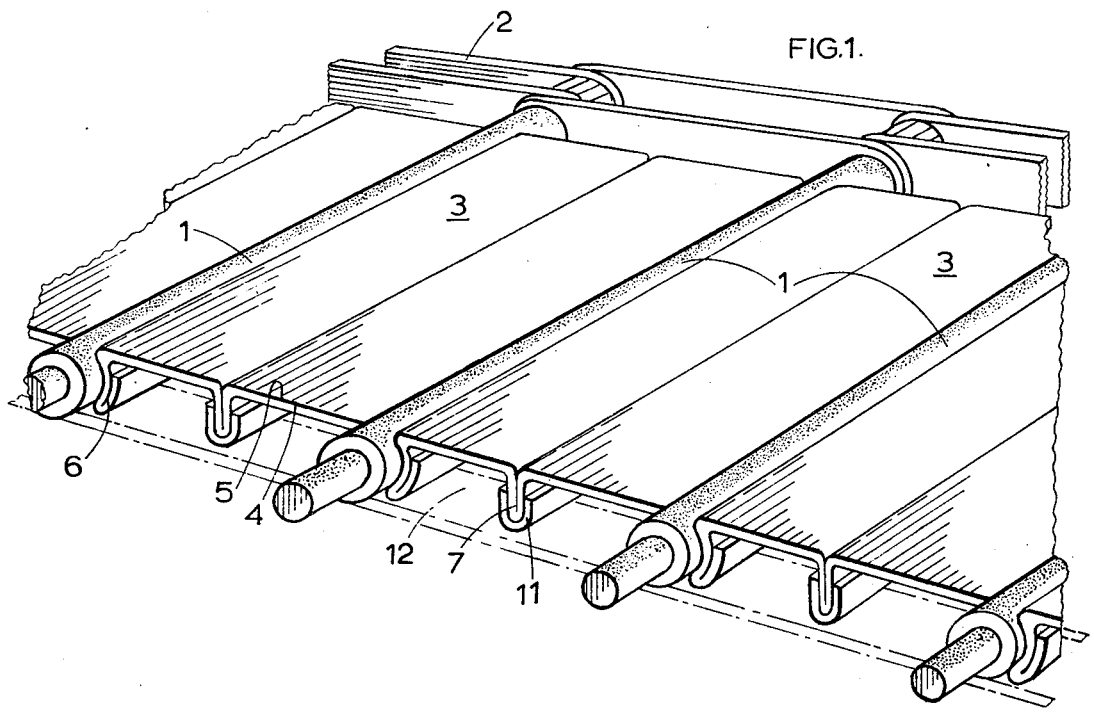
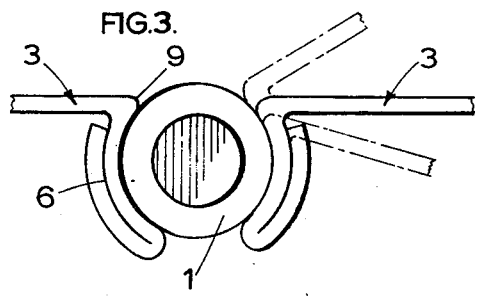

CONVEYOR BELT

This invention relates to conveyor belts of the plate link type.

The present invention consists in a conveyor belt comprising a series of cross rods coupled together at their ends in spaced, parallel relationship at fixed distances apart, and plate links which extend between said cross rods, have load-supporting surfaces and have opposite sides adjacent to said cross rods formed with channel-shaped recesses having mouths which are directed lengthwise of the belt away from one another, and which said recesses nestlingly and rotatably receive parts of the peripheries of said cross rods.

The links are located with respect to the cross rods solely by the nestling engagement. In the course of assembling the belt, as the cross rods are progressively coupled together the links are fitted into place between them, and the action of coupling the rods together at their ends simultaneously locates the links positively against separation from the cross rods.

The nestling engagement of the cross rods in the recesses allow the links to hinge about the cross rods.

Normally the cross rods will be of circular cross-section, and the recesses of the links will be of a complementary part-circular form. In this form the full surface of each recess is in contact with the cross rod it engages. However, a satisfactory connection can be obtained by limiting the contact that the recesses have with the cross rods just to the opposite edges of their mouths, in which case the recesses may be of non-complementary part-circular form, or part-elliptical or other non-complementary forms, including rectangular or triangular. It is essential, whatever their shape, that the recesses should be of sufficient depth to ensure that the nestling engagement of the cross rods in the recesses is secure. Nevertheless, whilst bearing this in mind, it will be appreciated that the shallower the recesses are the wider will be the range of possible angular movement of the links about the rods.

Where, for example, the belt is in the form of a simple endless loop and the links are only required to turn about the cross rods to one side only of the general plane of the load supporting surface of the belt in order to pass around the ends of the loop, it is possible that the recesses of each link may be off-set towards the load supporting surface of the link from a position of symmetry relative to a common plane passing through the longitudinal axes of notional cylinders on the circumferences of which the opposite edges of the mouths of the recesses at the opposite sides of the link lie. Where the recesses are part-circular the axes of the notional cylinders will of course be the axes of curvature of the concave surfaces of the recesses. In the off-set arrangement the mouths of the recesses are still directed largely lengthwise of the belt.

If the belt is required to travel around reverse curves as well, so that the links must be able to turn to both sides of the general plane mentioned, the recesses may be symmetrically disposed with respect to the common plane passing through the longitudinal axes of the aforesaid notional cylinders and receive a relatively small part of the circumference of the cross rods. The latter may result from having the cross rods of a diameter substantially greater than the thickness of the links, or at least greater than the dimensions of the portions of the links containing the recesses, as measured at right angles to the planes of the supporting surfaces of the links, so that the rods protrude from the level of the supporting surfaces.

The recesses of each link may be formed in surfaces, or be defined by the bodily shaping, of flanges which project from a main body of the link. Alternatively, in links of substantially slab form the recesses may be formed in opposite side edges of the links, that is within the general thickness of the material of the links.

The links may be made of metal, preferably as cold-rolled sections, or of suitable plastics material, for example nylon.

In the form of link mentioned above having flanges in which the recesses are formed or defined, which form of link is suitable for lightweight belt constructions, the link may be strengthened if necessary by one or more stiffening webs. The or each web may extend across the link transversely of the belt at the underside of the link. The web may bear on guide members or bearers for the belt to assist in supporting the link. To reduce friction between the web and the guide members or bearers, the web is preferably fitted with either a continuous heel of nylon or like appropriate material which extends for the length of the web, or separate heels at the parts at which the guide members or bearers are engaged. It would be possible for the web or webs to extend lengthwise of the belt instead.

The cross rods may be coupled together at their ends in any convenient manner. They may be coupled together directly, for example by forming their ends so that they hook into engagement with one another, or they may be coupled together indirectly, for example by being connected to driving chains running alongside the belt.

A belt in accordance with the present invention may be constructed more cheaply and more easily than the conventional form of plate link conveyor belt in which the links have hinge eyes at their transverse edges through which the cross rods pass to hinge the links together. Whereas in the latter form of belt the links require several forming operations to produce the hinge eyes, links of the present belt may be formed in one operation. They may be made for example as forgings, mouldings or extrusions of lengths corresponding to the width of belt required, or they may be cut from longer lengths from which several links can be obtained. In assembling the belt the cross rods simply have to be fitted against the links so that they engage in the recesses, rather than being threaded through hinge eyes as is the case in the assembly of belts of conventional form. This can be effected easily and quickly. The reduction in forming operations and the relative ease of assembly means that a smaller labor force can be used than previously for a comparable output.

An embodiment of the invention will now be described by way of example with reference to the accompanying drawings in which, FIG. 1 is a fragmentary perspective view of part of a conveyor belt in accordance with the present invention, FIG. 2 is an end view of a plate link of the conveyor belt, and FIG. 3 is a fragmentary end view showing the connection between a cross rod and adjacent plate links of the belt.

The conveyor belt comprises spaced, parallel, cross rods 1 of circular cross-section which are connected in known manner at their ends to two parallel driving chains 2, only one of which is shown in the drawings, running along opposite sides of the belt, and cold-rolled metal plate links 3 hingedly supported by the cross rods 1.

There is one link 3 located between each adjacent pair of cross rods 1. It extends across the full width of the belt.

Each link 3 is formed from a rectangular plate metal blank which by the rolling operation is shaped to provide: a flat body part 4 having a flat load supporting surface 5; a depending side flange 6 at and extending continuously along each of the two transverse sides of the body, and a depending central stiffening web 7 which runs continuously across the width of the link parallel to the side flanges 6. At each side flange 6 the blank is folded to double thickness. The web 7 is formed by a fold in the blank.

Each side flange 6 is arcuately curved to present at its concave side a shallow channel 8, FIG. 2, which is complementary in its curvature to the cylindrical surfaces of the cross rods 1, and extends across the width of the link. The channels 8 at opposite sides of each link are disposed with their mouths directed away from one another. The curvature of the channels 8 at the opposite sides is symmetrical about a plane 'p' parallel to the supporting surface 5 of the link and passing through the axes of curvature of the two channels. The side flanges 6 depend from the body 4 a distance substantially equal to the diameter of the cross rods. They are each so shaped, however, that an upper edge 9 of the mouth of its channel 8 is at the level of the load supporting surface 5 of the link whereas a lower margin 10 of the channel is spaced a little above the bottom of the flange.

In assembling the belt the cross rods 1 are fitted in closely nestling engagement with the channels 8, the surfaces of which have full contact with the cross rods, and this locates the links securely in place, whilst permitting them to hinge about the cross rods. The belt is progressively constructed in the following manner. First a cross rod 1 is connected at its ends to the driving chains 2, next a link 3 is fitted between the chains, engaging the channel 8 of one of its flanges 6 with the cross rod, and then another cross rod is connected to the chains and in the course of so doing is engaged with the channel of the other flange of the link just fitted to secure that link in position. The alternate fitting of cross rods and links in this manner is continued until the belt is completed. In the constructed belt there is a space between the bottoms of the flanges 6 of the adjacent links engaged with each cross rod 1, and, because of the positioning of the channels 8 in the flanges, the cross rods protrude above the level of the supporting surfaces of the fitted links, as shown in FIG. 3. This enables the links to hinge in two directions about the cross rods as indicated by the broken lines in FIG. 3 and so allows the belt to pass round bends running in either direction away from a straight run of the belt.

The web 7 of each link depends slightly less than the flanges 6 as will be seen from FIG. 2 and is fitted along its bottom edge with a nylon, or other suitable plastics, bead 11 of U-section. This serves as a heel which when the belt is installed for use, is able to bear with reduced friction on supports or guides 12 for the belt which extend longitudinally of the belt adjacent the sides of the belt.

The added rigidity given to the links by their central webs 7 enables lighter gauge material to be used in their construction than in the conventional form of plate link for comparable strength.

It will be understood that two or more links, could be fitted side-by-side between each pair of cross rods, if desired.

I claim:

1. A conveyor belt comprising a series of cross rods coupled together at their ends in spaced, parallel relationship at fixed distances apart and load-bearing plate links which extend between and are supported by said cross rods, each said plate link extending between an adjacent pair of said cross rods and having a load-supporting surface and two opposite sides adjacent to and extending lengthwise of said cross rods, which said sides each have a longitudinal channel-shaped recess with a mouth facing in the lengthwise direction of the belt towards said adjacent cross rod and away from said opposite side of said plate link, and into which said recess a part of the periphery of the cross section of said adjacent cross rod is nestlingly and rotatably received through said mouth, said periphery part being less than half the periphery and the construction and arrangement being such that the engagement of said periphery parts of said cross rods in said recesses retains said plate links hingedly to said cross rods.

2. A conveyor belt according to claim 1 wherein said cross rods are of circular cross-section and said recesses are of complementary part-circular section.

3. A conveyor belt according to claim 1 wherein each said plate link has a body at which is said load-supporting surface, and flanges which project from two opposite sides of said body and are shaped to form said recesses.

4. A conveyor belt according to claim 3 wherein each said plate link has a surface opposite to said load-supporting surface at which there is a integral stiffening web which extends transversely of the belt.

5. A conveyor belt according to claim 4 wherein support means extend longitudinally of the belt below said plate links and said stiffening webs bear on said support means.

6. A conveyor belt comprising a series of cross rods coupled together at their ends in spaced, parallel relationship at fixed distances apart and load-bearing plate links which extend between and are supported by said cross rods, each said plate link extending between an adjacent pair of said cross rods and being made from plate metal shaped to form a load-supporting surface, and at two opposite sides of said load-supporting surface adjacent said cross rods flanges which extend lengthwise of said cross rods and at which the plate metal is folded to double thickness, said flanges projecting from said body in directions opposite from the direction in which said load-supporting surface faces and each being bodily bent to form a longitudinal channel-shaped recess which has a mouth facing in the lengthwise direction of the belt towards said adjacent cross rod and away from said opposite side of said plate link, and into which said recess a part of the periphery of the cross section of said adjacent cross rod is nestlingly and rotatably received through said mouth, said periphery part being less than half the periphery and the construction and arrangement being such that the engagement of said periphery parts of said cross rods in said recesses retains said plate links hingedly to said cross rods.

7. A conveyor belt according to claim 6 wherein each said plate link has a surface opposite to said load-supporting surface from which a stiffening web projects formed by a central transverse fold in the plate metal of said plate link extending parallel to said flanges.

8. A conveyor belt according to claim 7 wherein said mouth of each said recess of each said plate link has an edge at said load-supporting surface of said plate link.

9. A conveyor belt according to claim 7 wherein said stiffening web has an edge remote from said opposite surface fitted with a U-section bead, and wherein support means extend longitudinally of the belt below said plate links on which said bead bears.

* * * * *